US009520221B2

(12) United States Patent
Weber et al.

(10) Patent No.: US 9,520,221 B2
(45) Date of Patent: Dec. 13, 2016

(54) METHOD FOR FUNCTION MONITORING AND/OR CONTROL OF A COOLING SYSTEM, AND A CORRESPONDING COOLING SYSTEM

(75) Inventors: Benjamin Weber, Winterberg (DE); Bhavesh Patel, Brilon (DE); Jens Tepper, Brilon (DE); Bruno Agostini, Dietikon (CH); Marcos Bockholt, Paderborn (DE); Michael Luckey, Marsberg (DE)

(73) Assignee: ABB Schweiz AG, Baden (CH)

( * ) Notice: Subject to any disclaimer, the term of this patent is extended or adjusted under 35 U.S.C. 154(b) by 609 days.

(21) Appl. No.: 13/174,069

(22) Filed: Jun. 30, 2011

(65) Prior Publication Data

US 2012/0000628 A1 Jan. 5, 2012

(30) Foreign Application Priority Data

Jul. 1, 2010 (EP) .................................... 10006813

(51) Int. Cl.

| | |
|---|---|
| ***B60H 1/00*** | (2006.01) |
| ***H01F 27/18*** | (2006.01) |
| ***F28D 15/02*** | (2006.01) |
| ***F28D 15/06*** | (2006.01) |
| ***F28F 27/00*** | (2006.01) |

(52) U.S. Cl.
CPC ............... *H01F 27/18* (2013.01); *F28D 15/02* (2013.01); *F28D 15/06* (2013.01); *F28F 27/00* (2013.01)

(58) Field of Classification Search
CPC ........... F28F 27/00; G06F 15/00; F28D 15/02; F28D 15/0275; F28D 15/06; F28D 15/0216
USPC ...... 165/11.1, 247, 288, 289, 290, 293, 299, 165/300, 53, 97, 104.21, 122, 128; 702/136; 700/275, 299
See application file for complete search history.

(56) References Cited

U.S. PATENT DOCUMENTS

| | | | | |
|---|---|---|---|---|
| 3,167,113 | A * | 1/1965 | Kleiss | 165/293 |
| 3,918,300 | A * | 11/1975 | Weisstuch et al. | 73/113.01 |
| 4,145,679 | A | 3/1979 | Mitchell, Jr. | |
| 4,337,820 | A | 7/1982 | Pierce | |
| 4,574,870 | A * | 3/1986 | Weitman | 165/292 |
| 6,026,891 | A * | 2/2000 | Fujiyoshi et al. | 165/104.33 |
| 8,175,757 | B2 * | 5/2012 | Aggus et al. | 700/300 |
| 2003/0075314 | A1 * | 4/2003 | Cryer et al. | 165/254 |
| 2006/0290366 | A1 * | 12/2006 | Kon et al. | 324/760 |

FOREIGN PATENT DOCUMENTS

| | | | |
|---|---|---|---|
| EP | 2 333 798 | A1 | 6/2011 |
| WO | WO 2009/104197 | A1 | 8/2009 |

OTHER PUBLICATIONS

European Search Report issued on Feb. 1, 2011, by European Patent Office (with English language translation of category of cited documents).

* cited by examiner

*Primary Examiner* — Travis Ruby
(74) *Attorney, Agent, or Firm* — Barnes & Thornburg LLP

(57) ABSTRACT

Exemplary embodiments relate to a system and method for monitoring functional operational reliability of a cooling system having at least one thermosyphon for transformers provided with at least one evaporator and with at least one condenser. The cooling system using a coolant which can be vaporized and a gaseous medium, as a heat carrier.

10 Claims, 3 Drawing Sheets

METHOD FOR FUNCTION MONITORING AND/OR CONTROL OF A COOLING SYSTEM, AND A CORRESPONDING COOLING SYSTEM

RELATED APPLICATION

This application claims priority under 35 U.S.C. §119 to European Patent Application No. 10006813.9 filed in Europe on Jul. 1, 2010, the entire content of which is hereby incorporated by reference in its entirety.

FIELD

The disclosure relates to cooling systems, such as a method for function monitoring or control of a cooling system having at least one thermosyphon, and in particular for transformers, (e.g., dry transformers), with a cooling system having at least one evaporator and at least one condenser, using a coolant which can be vaporized and a gaseous medium (e.g., air), as a heat carrier, and to a system for carrying out this method.

BACKGROUND INFORMATION

Known cooling systems equipped with a thermosyphon can use water and air as heat carriers, and use a coolant as an intermediate cooling medium.

The monitoring technology which is currently used for air-air and air-water cooling systems can be unreliable in predicting and assessing the operation of the thermosyphon.

For example, it can be difficult to obtain an early determination relating to the filling level of the system with the heat carrier medium. The temperature and pressure difference values, which are in each case measured through sensors, alone may not be suitable for providing this information. These sensors can later identify a fault, only in the case of a coolant leakage.

In cooling systems in which the current technologies, for example air-water heat exchangers, air-air heat exchangers and laminate tube bundle heat exchangers are used, the function and operational reliability can be monitored through various sensors that measure values such as water leakage, pressure difference, and temperature.

Water leakage sensors have been used in maritime application to detect a fracture in the air-water cooler and, correspondingly, to prevent the ingress of water into electrical functional areas of the housing.

Difference-pressure sensors can monitor the fans or the air inlets and air outlets of the cooling system.

Temperature measurement can be used to monitor the temperatures of the cooling air and of the windings and, possibly, to initiate corrective measures.

European Patent Application No. 09015185.3 discloses a cooling system that is intended for cooling a transformer and makes use of the advantages of the thermosyphon principle, (e.g., thermosyphon technology).

However, known systems and methods do not include monitoring and diagnosis strategies.

SUMMARY

An exemplary method for monitoring the function and the operational reliability of a cooling system having at least one thermosyphon, for transformers is disclosed. The cooling system includes at least one evaporator and at least one condenser, and using a coolant which can be vaporized and a gaseous medium, as a heat carrier. The method comprises determining a heat exchanger effectiveness of the cooling system wherein a global effectiveness ϵ of the thermosyphon is determined using the relationship $$\varepsilon = \frac{(T_{env} - T^{out}_{condens})}{(T_{env} - T^{in}_{evap})}$$

or $$\varepsilon = \frac{(T^{in}_{evap} - T^{out}_{evap})}{(T^{in}_{evap} - T_{env})}$$

which is a ratio of a difference between a temperatures at condenser inlet ($T_{env}$) and at a condenser outlet ($T_{condens}{}^{out}$) to a difference between a temperatures at the condenser inlet ($T_{env}$) and at a evaporator inlet ($T_{evap}{}^{in}$).

An exemplary cooling system is disclosed. The cooling system comprising at least one thermosyphon for transformers arranged in a housing, wherein the at least one thermosyphon includes at least one evaporator and at least one condenser, a coolant which can be vaporized, a gaseous medium as a heat carrier, and temperature sensors to perform temperature measurements.

DESCRIPTION OF THE DRAWINGS

The disclosure, advantageous refinements and improvements of the disclosure, and particular advantages of the disclosure will be explained and described in more detail with reference to one exemplary embodiment of the disclosure, which is illustrated in the attached drawing, in which.

DETAILED DESCRIPTION

Against the background of the known implementations exemplary embodiments of the present disclosure provide a method and a cooling system that allow reliable and valid determinations relating to the current state of the system to be made in a manner that is less complex as known systems as possible. This can involve the development of new logic and a new signal processing strategy for early fault recognition.

Exemplary embodiments of the present disclosure provide for a thermodifference method and/or a method of heat exchanger effectiveness to be used to monitor the function and the operational reliability of the cooling system which is provided with a thermosyphon.

In the thermodifference method, the temperature difference DT between the coolant in the at least one condenser and in the at least one evaporator can be formed, using the equation:

$$DT = T_{evap}{}^{manifold} - T_{condens}{}^{manifold} \qquad (1)$$

where $T^{manifold}{}_{evap}$=Temperature in the evaporator and where $T^{manifold}{}_{cond}$=Temperature in the condenser.

In this method, the temperature difference is formed between the coolant in the condenser container and in the evaporator container.

Figure 4:
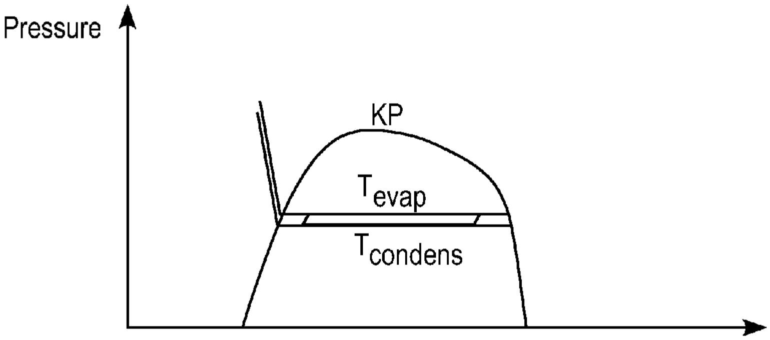
FIG. 4 is a pressure enthalpy diagram of an inner cooling circuit in accordance with an exemplary embodiment.

The pressure drop in the thermosyphon can produce a low value. In an exemplary embodiment, the pressure and the temperature are coupled to one another when using two-phase coolants (liquid and gaseous), as is also shown in FIG. 4. Since the pressures in the containers differ slightly from one another, the temperature difference is also virtually zero (DT~0).

However, in the event of a leakage, the temperature gradient along the thermosyphon is no longer negligible, because the thermal resistance between the evaporator (hot point) and condenser (cold point) is substantially higher, that is $$DT \sim (T_{hot} - T_{cold}). \tag{2}$$

Figure 2:
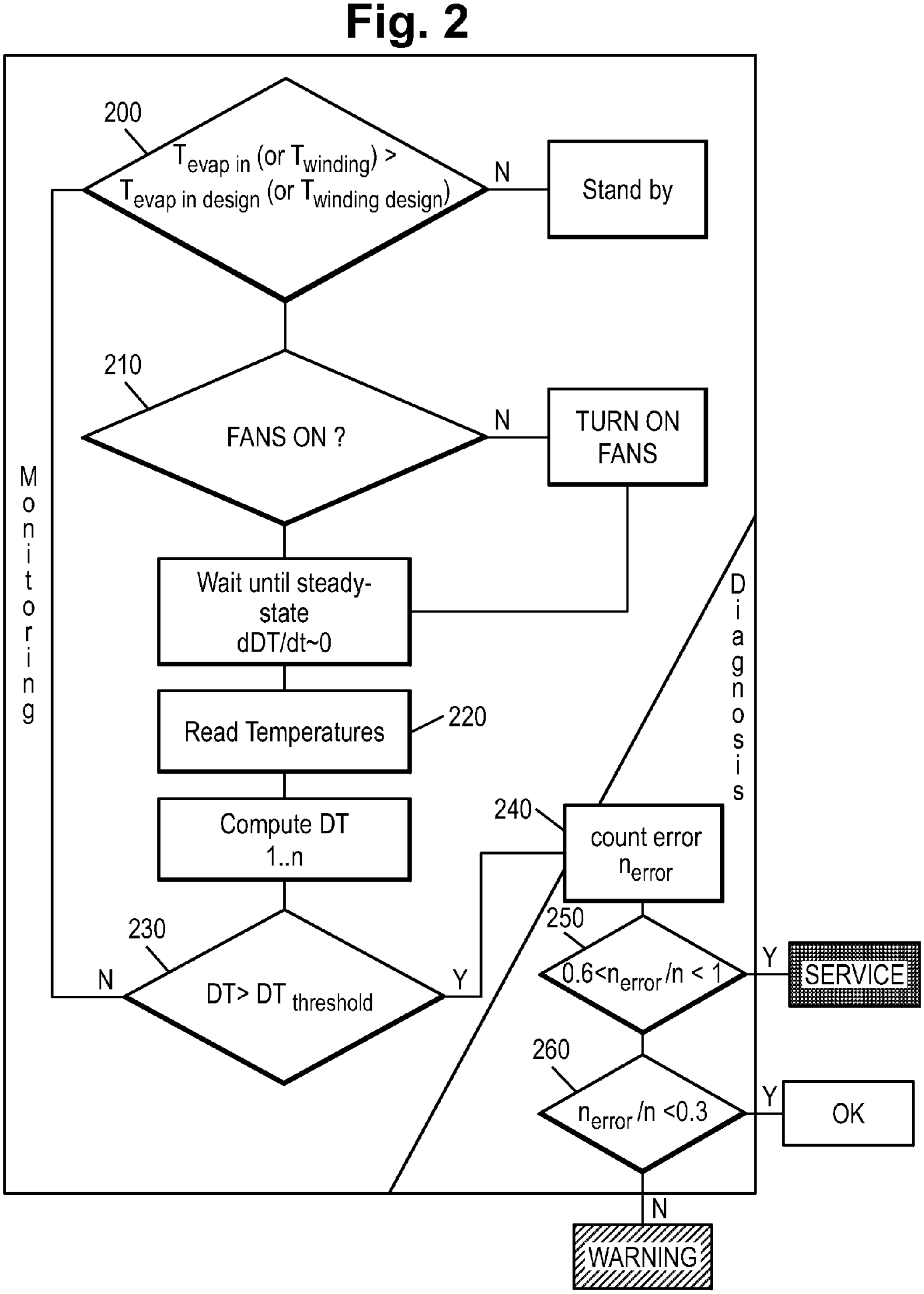
FIG. 2 is a flow chart for an implementation of a thermodifference method in accordance with an exemplary embodiment.

The cooling system functionality can be monitored using the exemplary algorithm illustrated in FIG. 2.

In an exemplary embodiment of the present disclosure, the measurements can be carried out sequentially to reduce the number of measurement channels which are required to record the temperature characteristic values.

In another exemplary embodiment of the present disclosure, the two temperatures on a thermosyphon element are in each case measured at the same time.

The method of heat exchanger effectiveness can be provided as an exemplary measurement and monitoring method according to the present disclosure. This method provides that the global effectiveness $\epsilon$ of the thermosyphon system is formed using the relationship $$\varepsilon = \frac{(T_{env} - T_{condens}^{out})}{(T_{env} - T_{evap}^{in})} \tag{3}$$

from the ratio of the difference between the temperatures at the condenser inlet ($T_{env}$) and at the condenser outlet ($T_{condens}^{out}$) to the difference between the temperatures at the condenser inlet ($T_{env}$) and at the evaporator inlet ($T_{evap}^{in}$).

By way of example, $$C_{condens} > C_{evap} \tag{4}$$

where C=cp*m cp=The specific thermal capacity of the air at a constant pressure m=Airflow.

In a situation where $$C_{condens} < C_{evap} \tag{5}$$

where C=cp*m

Then:

$$\varepsilon = \frac{(T_{evap}^{in} - T_{evap}^{out})}{(T_{evap}^{in} - T_{env})} \tag{6}$$

The global effectiveness of the thermosyphon, system can be determined using Equation (3), by means of the temperature values at the condenser inlet ($T_{env}$), at the evaporator inlet ($T_{evap}^{in}$) and at the condenser outlet ($T_{condens}^{out}$).

If one or more thermosyphons fail, the condenser outlet temperature ($T_{condens}^{out}$) falls, and the temperature at the evaporator inlet ($T_{evap}^{in}$) rises. This can lead to a reduction in the effectiveness value. This reduction can be correlated with a number of defective thermosyphons.

In order to compensate for such faults, it is worthwhile defining a critical lower value for the effectiveness figure (eff_l).

If the air volume flow of the condenser inlet decreases, for example with a reduced inlet cross section of the air inlets because of deposits, the air temperature of the condenser outlet rises. In a corresponding manner, the effectiveness value increases, if the evaporator inlet temperature is constant.

In order to cover this fault situation, it is worthwhile defining an upper limit for the effectiveness value (eff_u).

The limit values for the effectiveness (eff_l and eff_u) are determined, for example, together with the air temperatures within the housing, during the heat run test "D".

In an exemplary method of the present disclosure, in the event of a disturbance, for example the "warning" state (signals in FIGS. 2 and 3), in order to rectify the disturbance, the flow of the gaseous heat carrier can be interrupted at least at times, or, if required, the flow direction of the gaseous heat carrier can be reversed, at least at times.

In another exemplary embodiment of the present disclosure the condenser and the evaporator can be heated by supplying heat from a heat source in order to prevent condensation formation in the condenser housing or icing of the condenser heat exchanger in each case, for example at the relevant outlets.

An exemplary embodiment of the present disclosure, a cooling system, in particular a cooling system for transformers, (e.g., dry transformers), having at least one thermosyphon, is that arranged in a housing and is provided with at least one evaporator and at least one condenser, and uses a coolant, which can be vaporized, and a gaseous medium, (e.g., air), as a heat carrier, which is suitable for carrying out the exemplary method described above.

In particular, the exemplary cooling system can include temperature sensors in the housing, to determine the relevant temperatures, for determining the characteristic values required for the thermodifference method and/or for the method of heat carrier effectiveness.

In another exemplary embodiment of the present disclosure, the cooling system includes, fan devices that are used to produce a flow of the gaseous medium.

The feed of the gaseous medium can be interrupted at times, and the flow direction of the gaseous medium can be reversed by changing the feed direction of the fan device.

In a further exemplary embodiment of the present disclosure, the cooling system can include at least one heat source arranged in the housing, which holds the at least one condenser and the at least one evaporator. The heat source can be formed by at least one heating element.

An exemplary monitoring method of the present disclosure can use the information of the temperature, to diagnose the functionality of the thermosyphon. This method can lead to a considerable reduction in the number of sensors in the system since, for example, there is no need for pressure sensors or pressure difference sensors.

Figure 1:
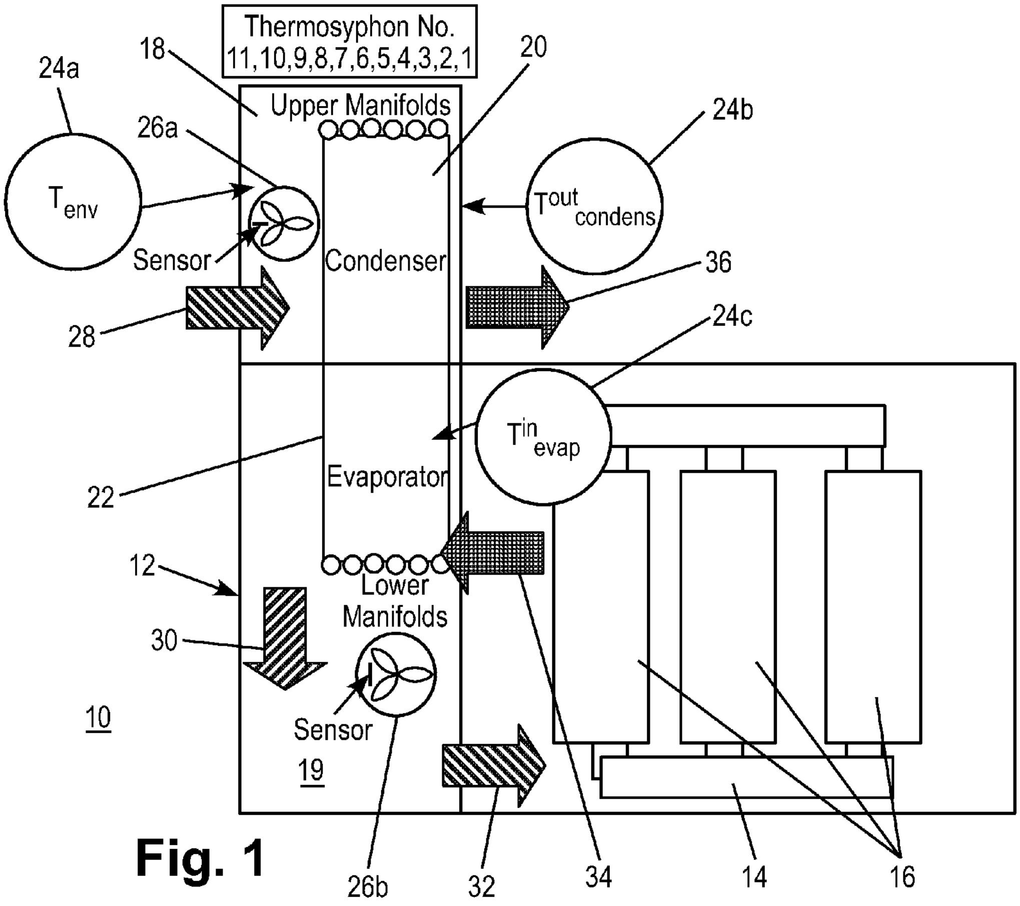
FIG. 1 is a schematic illustration of a transformer using thermosyphon technology in accordance with an exemplary embodiment.

As shown in FIG. 1, a transformer 10 has a housing 12 which includes an iron core 14 with three winding arrangements 16, and separate therefrom, each winding arrangement includes one condenser 20 and one evaporator 22 are arranged in separate chambers 18, 19.

A total of five temperature sensors **24*a*, 24*b*, 24*c*, 26*a*, 26*b* can be arranged in the housing 12, of which, the sensors 24*a*, 24*b*, 24*c* can be used on the one hand for determining the specified characteristic values for determination of the effectiveness (e.g., heat exchanger effectiveness method), and on the other hand for determining the required characteristic values for determination of the thermodifference between the coolant in the condenser 20 and the coolant in the evaporator 22** (e.g., temperature difference method).

In addition, arrows 28, 30, 32 (with shading) indicate a directional profile of the cold cooling fluid flowing into the housing 12 and within the housing 12, while arrows 34, 36 (with a dotted grid) show the outward flow of the cooling fluid loaded with heat losses out of the housing 12.

As indicated by the arrow 28, cold cooling fluid flows into the chamber 18 in the housing 12 and, after flowing through the condenser 20, a first part flows outwards carrying heat absorbed in the condenser 20, and another part flows into the chamber 19, from where it flows into the area in which the actual transformer with the iron core 14 and the winding arrangements 16 are arranged. In the process, the cooling fluid absorbs the heat losses emitted from the winding arrangements, and then flows into the evaporator 22.

As shown in FIG. 2, in Step 200 the monitoring process compares the temperature at the evaporator inlet (or the winding temperature) with predetermined design temperatures. If the threshold value has not been exceeded, the system is in standby and no action is taken. The fans continue to run or are not started if the temperature of the winding or at the evaporator inlet is too low.

In step 210, if the threshold temperature is exceeded and the fans are switched off, as shown in FIG. 1, they are restarted. In this case, the fan rotation speed can be regulated.

In step 220, the system waits for a steady state. The "manifold temperatures" at the condenser and at the evaporator are measured, and the differences between "n" thermosyphons are established.

In step 230, the differences are compared with a threshold value (e.g., DT threshold).

In step 240, if the threshold value has been exceeded, the counter $n_{error}$ (diagnosis) is incremented.

In step 250, the ratio of the defective thermosyphons is formed, and is compared with two threshold values (e.g., 0.6 and 1). If the ratio is in this range, a large number of thermosyphons are defective, and the functionality of the cooling system is at risk. Status service, inspection, and/or repair can be specified.

In step 260, if the ratio $n_{error}/n$ is not greater than a specific threshold value, which is still not critical (for example 0.3), the thermosyphon system is not at risk. This results in an "OK" status. If, however, critical threshold value (for example 0.3) is exceeded, the "warning" status is activated, and an inspection is required.

Figure 3:
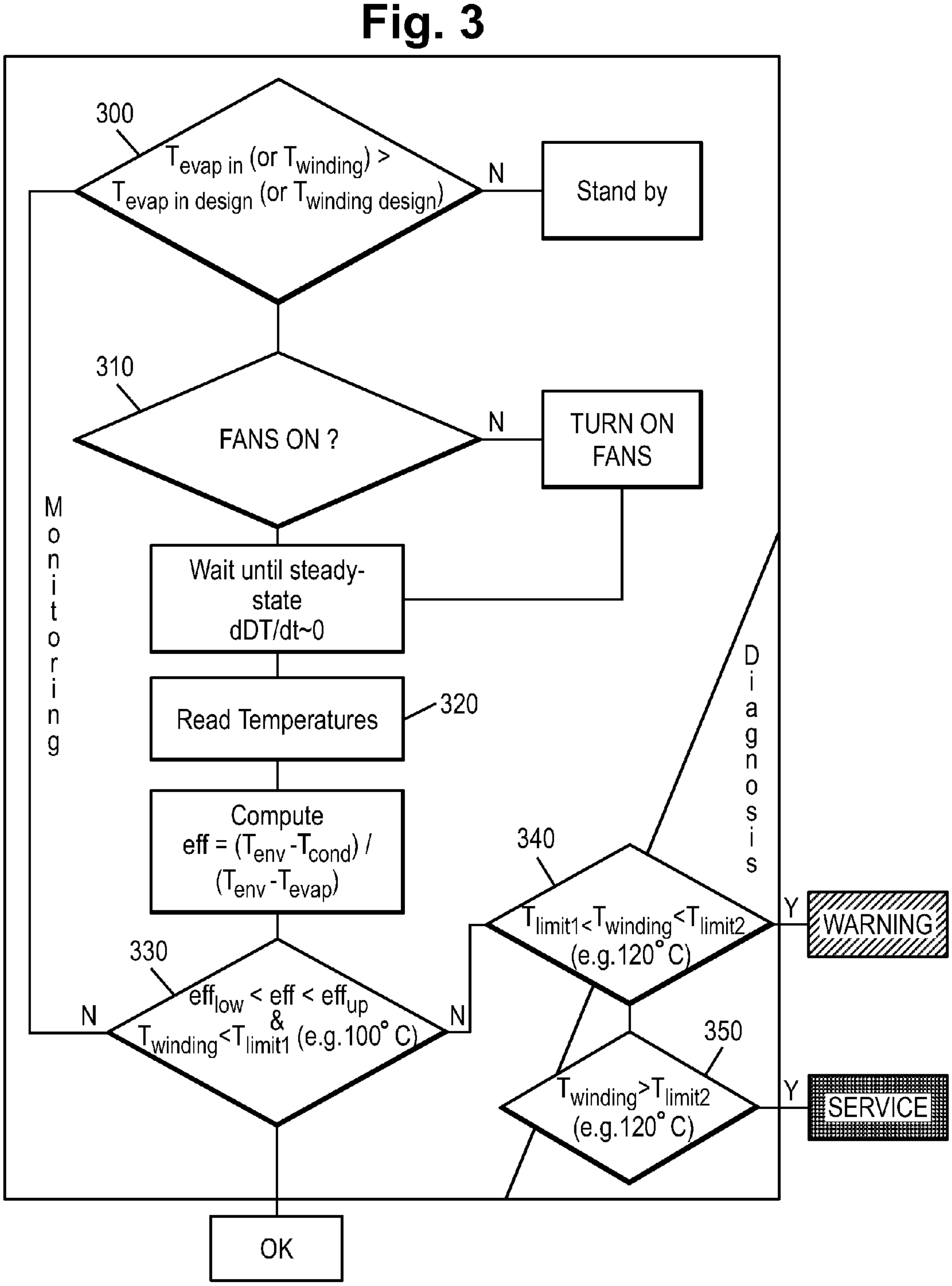
FIG. 3 is a flow chart for implementation of a heat exchanger effectiveness method in accordance with an exemplary embodiment.

As shown in FIG. 3, in Step 300 the monitoring compares the temperature at the evaporator inlet or the winding temperature with predetermined design temperatures. If the threshold value has not been exceeded, the system remains in standby, and no action is taken. The fans continue to run or are not started if the temperature of the winding or at the evaporator inlet is too low.

In Step 310, if the threshold temperature is exceeded, and the fans are switched off, as shown in FIG. 1, they are started. In this case, the fan rotation speed can be regulated.

In Step 320, the system waits for a steady state. The effectiveness figure eff is determined by calculation.

In Step 330, the effectiveness figure is compared with a lower threshold value $eff_{low}$– and an upper threshold value $eff_{up}$–. The winding temperature or the temperature at the evaporator inlet is likewise compared with a threshold value $T_{limit\ 1}$. If the condition is satisfied, the thermosyphon system is serviceable.

In Step 340, if the conditions in step 330 are not satisfied, the winding temperature or the air temperature at the evaporator inlet is once again compared with a second threshold value $T_{limit\ 2}$. If the temperature and the effectiveness value determined in Step 330 remain in an unacceptable range, a warning signal is indicated.

In Step 350, if the winding temperature or air temperature at the evaporator inlet rises above the second threshold value, an inspection and/or a repair can be specified (e.g., servicing). If the effectiveness figure is above $eff_{up}$ the condenser or the condenser fan can be inspected. If the effectiveness figure indicates a value below $eff_l$ one or more thermosyphons is or are damaged.

FIG. 4 shows a pressure-enthalpy diagram for the inner cooling circuit (coolant). The two-phase diagram (gas-liquid) has constant evaporation and condensation temperatures (pressures). The pressure drop in the thermosyphon is so low that any temperature difference is negligible.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

10 Transformer
12 Housing
14 Iron core
16 Winding arrangement
18 First chamber
19 Second chamber
20 Condenser
22 Evaporator
24 Temperature sensor
26 Temperature sensor
28 Arrow (with shading)
30 Arrow (with shading)
32 Arrow (with shading)
34 Arrow (with dotted grid)
36 Arrow (dotted grid).

What is claimed is:

1. A method for monitoring the function and the operational reliability of a cooling system having at least one thermosyphon, for transformers, the cooling system including at least one evaporator and at least one condenser, and using a coolant which can be vaporized in the at least one condenser and a gaseous medium, as a heat carrier in the at least one evaporator, the method comprising:

determining a heat exchanger effectiveness of the cooling system wherein a global effectiveness ϵ of the at least one thermosyphon is determined using the relationship $$\varepsilon = \frac{(T_{env} - T_{condens}^{out})}{(T_{env} - T_{evap}^{in})}$$

or $$\varepsilon = \frac{(T_{evap}^{in} - T_{evap}^{out})}{(T_{evap}^{in} - T_{env})}$$

which is a ratio of a difference between temperatures at a condenser inlet ($T_{env}$) and at a condenser outlet ($T_{condens}^{out}$) to a difference between a temperatures at the condenser inlet ($T_{env}$) and at an evaporator inlet ($T_{evap}^{in}$), comparing the evaporator inlet temperature with plural temperature threshold values;

comparing the global effectiveness $\epsilon$ of the at least one thermosyphon with plural effectiveness threshold values; and generating a warning signal when comparison results based on the plural temperature threshold values and comparison results based on the plural effectiveness threshold values are outside predetermined limits, wherein temperature measurements are carried out one of sequentially to reduce a number of measurement channels used to record temperature characteristic values or at a same time.

2. The method according to claim 1, wherein in the event of a disturbance, the flow of the gaseous heat carrier is interrupted at times to rectify the disturbance.

3. The method according to claim 1, wherein in the event of a disturbance, the flow direction of the gaseous heat carrier is reversed at times to rectify the disturbance.

4. The method according to claim 1, wherein the condenser and the evaporator are heated.

5. The method according to claim 1, comprising:

comparing the global effectiveness of the at least one thermosyphon with a lower effectiveness threshold and an upper effectiveness threshold.

6. The method according to claim 5, comprising:

comparing the evaporator inlet temperature with a first temperature threshold.

7. The method according to claim 6, comprising:

determining that the cooling system is serviceable, if the global effectiveness of the at least one thermosyphon is within a range of the lower and upper effectiveness thresholds and the evaporator inlet temperature is within the first temperature threshold.

8. The method according to claim 7, wherein when the global effectiveness is outside a range of the lower and upper effectiveness thresholds and the evaporator inlet temperature is outside the first temperature threshold, the method comprising:

comparing the evaporator inlet temperature with a second temperature threshold; and generating a warning signal if the global effectiveness of the at least one thermosyphon is outside the range of the lower and upper effectiveness thresholds and the evaporator inlet temperature is outside the second temperature threshold.

9. The method according to claim 8, comprising:

at least one of inspecting and repairing the cooling system if the evaporating inlet temperature is above the second temperature threshold.

10. The method according to claim 8, comprising:

inspecting the cooling system if the global effectiveness of the at least one thermosyphon is above the upper effectiveness threshold; and repairing the cooling system if the global effectiveness of the at least one thermosyphon is below the lower effectiveness threshold.

* * * * *